United States Patent
Herchenroder et al.

(10) Patent No.: US 10,239,626 B2
(45) Date of Patent: Mar. 26, 2019

(54) ARRANGEMENTS AND METHODS FOR SUPPLYING HEATED AIR TO A WING ANTI-ICING SYSTEM

(71) Applicant: Gulfstream Aerospace Corporation, Savannah, GA (US)

(72) Inventors: Anthony Herchenroder, Savannah, GA (US); Douglas Paul, Savannah, GA (US); Stephen Landers, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 282 days.

(21) Appl. No.: 15/084,209

(22) Filed: Mar. 29, 2016

(65) Prior Publication Data

US 2017/0283076 A1    Oct. 5, 2017

(51) Int. Cl.
*B64D 15/04* (2006.01)
*B64D 13/08* (2006.01)
*B64D 13/06* (2006.01)

(52) U.S. Cl.
CPC .............. *B64D 15/04* (2013.01); *B64D 13/08* (2013.01); *B64D 2013/0607* (2013.01); *B64D 2013/0618* (2013.01)

(58) Field of Classification Search
CPC ........ B64D 15/00; B64D 15/04; B64D 13/08; B64D 2013/0607; B64D 2013/0618
See application file for complete search history.

(56) References Cited

U.S. PATENT DOCUMENTS

| | | | | |
|---|---|---|---|---|
| 3,749,336 A * | 7/1973 | Christensen | ........... | B64D 15/02 244/134 B |
| 3,981,466 A * | 9/1976 | Shah | ..................... | B64D 15/02 165/42 |
| 4,482,114 A * | 11/1984 | Gupta | .................... | B64D 15/02 244/118.5 |
| 5,137,230 A * | 8/1992 | Coffinberry | ............. | B64C 21/06 244/118.5 |
| 5,279,130 A * | 1/1994 | Donaldson | ............. | B64D 13/06 62/172 |
| 6,796,527 B1 * | 9/2004 | Munoz | ................... | B64D 13/06 244/118.5 |
| 8,602,362 B2 * | 12/2013 | Buchwald | ............. | B64D 37/32 220/88.3 |
| 2002/0162345 A1* | 11/2002 | Laugt | ..................... | B64D 13/02 62/239 |
| 2002/0166923 A1* | 11/2002 | Munoz | ................... | B64D 13/06 244/118.5 |

(Continued)

*Primary Examiner* — Magdalena Topolski
(74) *Attorney, Agent, or Firm* — LKGlobal | Lorenz & Kopf, LLP

(57) ABSTRACT

An arrangement for supplying heated air to a wing anti-icing system on an aircraft propelled by a jet engine includes, but is not limited to, an ejector that is configured for coupling to a wing anti-icing system. The ejector is further configured to receive a first flow of air, to entrain a second flow of air with the first flow of air, the second flow of air having a lower temperature than the first flow of air, to mix the first flow of air with the second flow of air to form a combined flow having a temperature and a volume suitable for use by the wing anti-icing system, and to exhaust the combined flow into the wing anti-icing system.

18 Claims, 3 Drawing Sheets

(56) References Cited

U.S. PATENT DOCUMENTS

| | | | | |
|---|---|---|---|---|
| 2009/0235670 A1* | 9/2009 | Rostek | ............... | B64D 13/02 |
| | | | | 60/785 |
| 2009/0326737 A1* | 12/2009 | Derouineau | ......... | B64D 13/06 |
| | | | | 701/3 |
| 2013/0294950 A1* | 11/2013 | Massey | ............... | B64D 13/08 |
| | | | | 417/410.1 |
| 2017/0275005 A1* | 9/2017 | Uefuji | ............... | B64D 15/04 |

* cited by examiner

ARRANGEMENTS AND METHODS FOR SUPPLYING HEATED AIR TO A WING ANTI-ICING SYSTEM

TECHNICAL FIELD

The present invention generally relates to aviation and more particularly relates to arrangements and methods for supplying heated air to a wing anti-icing system on an aircraft propelled by a jet engine.

BACKGROUND

Modern jet aircraft commonly include a wing anti-icing system to keep the leading edges of the wings clear of ice. The atmospheric temperatures at altitude are well below freezing while visible moisture is present and without a wing anti-icing system, ice may form on the wing. This is undesirable.

Some wing anti-icing systems route hot air to the wing's leading edge to heat the leading edge and thereby inhibit the formation of ice. The source of the hot air for such wing anti-icing systems is bleed-air taken from the compressor section of the aircraft's jet engine. Bleed-air extracted from the compressor section can have a temperature of approximately five hundred degrees Fahrenheit. Using the bleed-air at this high temperature entails undesirable risks and complications. Furthermore, these risk and complications are unnecessary because five hundred degrees Fahrenheit is well above the temperature needed to keep the leading edge of the wing free of ice.

One common solution is to cool the bleed-air to a more manageable temperature before routing it to the wings. This is accomplished through the use of a pre-cooler. The pre-cooler receives the bleed air from the compressor. At the same time, the pre-cooler also receives a relatively high volume of cooling-air siphoned from the freestream flowing past the exterior of the aircraft. The free stream air is relatively cool (e.g., fifty degrees below zero, Fahrenheit) and in plentiful supply and therefore is well suited for cooling the bleed-air. By routing the bleed-air through a network of cooling pathways (e.g., ducts) and by passing the cooling-air around the cooling pathways, the temperature of the bleed-air is reduced down to a range of between two hundred to two hundred fifty degrees Fahrenheit. At the same time, the cooling-air is warmed to between eighty degrees and one hundred degrees Fahrenheit as it passes over the cooling pathways carrying the bleed-air. This warmed cooling-air exits the pre-cooler and is returned to the freestream.

In order to be effective at inhibiting the formation of ice, the hot air must be supplied to the wing anti-icing system at a relatively high volume. The siphoning of compressed air from the compressor in sufficient volume to operate the wing anti-icing system leaves less air in the engine for engine operations such as generation of thrust. This does not pose a problem in larger aircraft with larger engines. This is because larger engines produce a surplus of compressed air. As a result, they do not suffer an appreciable diminution in airflow to the combustion section of the engine and, therefore, do not suffer any significant power drain or diminution in thrust generation.

In smaller jet aircraft with smaller jet engines, however, there is a less generous supply of compressed air produced by the compressor section. Siphoning off compressed air from a small jet engine will leave an undesirably low supply of compressed air available to reach the combustion section of the engine. This, in turn, will reduce the thrust produced by the smaller jet engine. This may have a negative impact on the performance of the aircraft. This reduction in thrust during operation of the wing anti-icing system is undesirable.

Accordingly, it is desirable to provide an arrangement for supplying the wing anti-icing system with an adequate supply of heated air while minimizing the power drain experienced by the jet engine. In addition, it is desirable to provide a method for supplying the wing anti-icing system with an adequate supply of heated air while minimizing the power drain experienced by the jet engine. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting arrangements and methods for supplying heated air to a wing anti-icing system on an aircraft propelled by a jet engine are disclosed herein.

In a first non-limiting embodiment, the arrangement includes, but is not limited to, an ejector that is configured for coupling to a wing anti-icing system. The ejector is further configured to receive a first flow of air. The ejector is further configured to entrain a second flow of air with the first flow of air. The second flow of air has a lower temperature than the first flow of air. The ejector is further configured to mix the first flow of air with the second flow of air to form a combined flow having a temperature and a volume suitable for use by the wing anti-icing system. The ejector is still further configured to exhaust the combined flow into the wing anti-icing system.

In another non-limiting embodiment, the arrangement includes, but is not limited to, a pre-cooler that is configured to receive a flow of bleed-air from the jet engine, to receive a flow of cooling-air from a freestream, to cool the flow of bleed-air with the flow of cooling air, to exhaust a flow of cooled bleed air, and to exhaust a flow of warmed cooling-air. The arrangement further includes, but is not limited to, an ejector that is configured to receive a portion of the flow of cooled bleed-air from the pre-cooler, to entrain a portion of the flow of warmed cooling-air with the portion of the flow of cooled bleed-air, to mix the portion of the flow of cooled bleed-air with the portion of the flow of warmed cooling-air to form a combined flow having a temperature and a volume suitable for use by the wing anti-icing system, and to exhaust the combined flow.

In another non-limiting embodiment, the method includes, but is not limited to the step of receiving a flow of bleed-air from the jet engine and a flow of cooling-air from a freestream at a pre-cooler. The method further includes, but is not limited to the step of cooling the flow of bleed-air with the flow of cooling-air at the pre-cooler. The method further includes, but is not limited to the step of exhausting a flow of cooled bleed-air and a flow of warmed cooling-air from the pre-cooler. The method further includes, but is not limited to the step of receiving a portion of the flow of cooled bleed-air at an ejector. The method further includes, but is not limited to the step of entraining a portion of the flow of warmed cooling-air with the portion of the flow of cooled bleed-air at the ejector. The method further includes, but is not limited to the step of mixing the portion of the flow of warmed cooling-air with the portion of the flow of cooled-bleed air at the ejector to form a combined flow. The method still further includes, but is not limited to the step of exhausting the combined flow from the ejector.

BRIEF DESCRIPTION OF THE DRAWINGS

The present invention will hereinafter be described in conjunction with the following drawing figures, wherein like numerals denote like elements.

DETAILED DESCRIPTION

Figure 1:
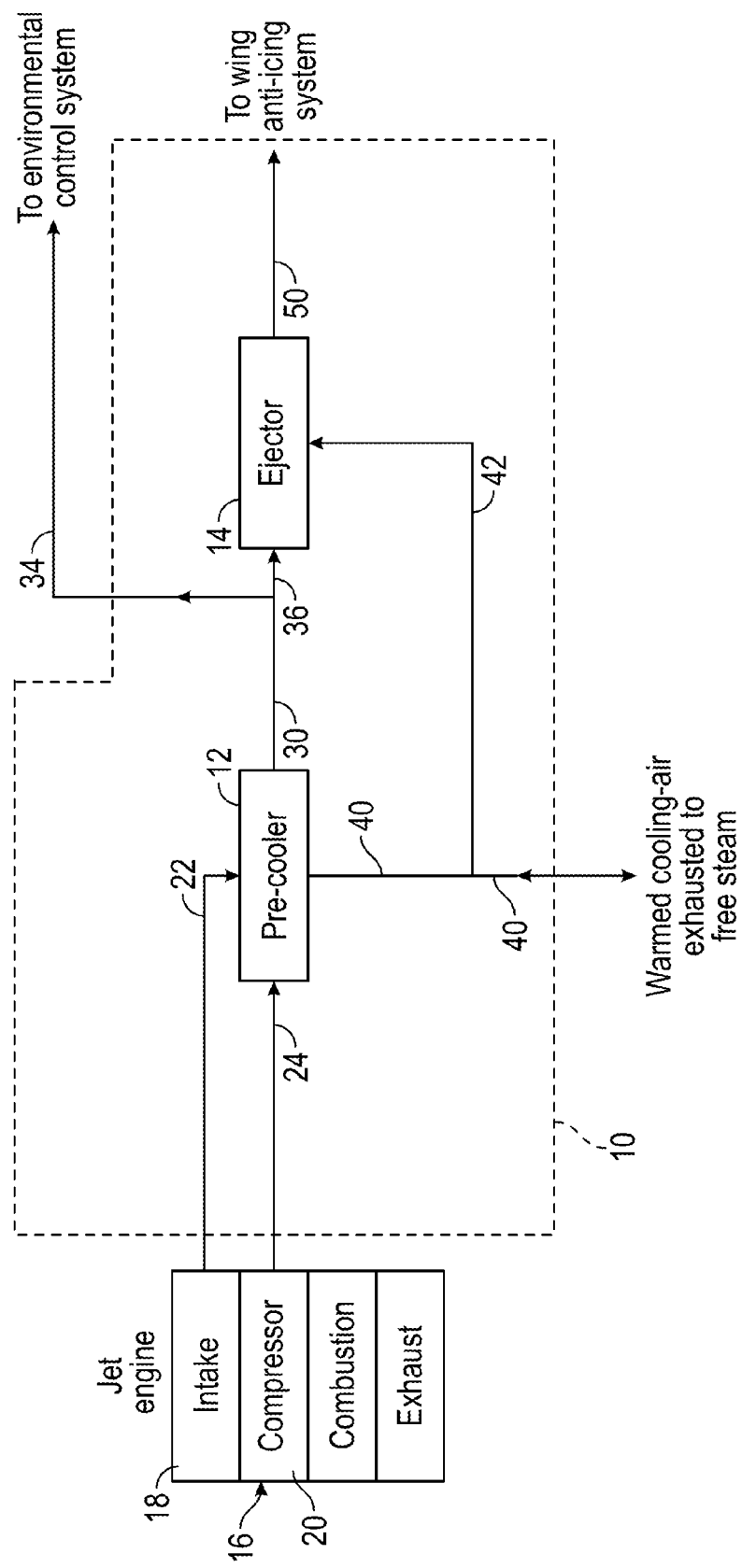
FIG. 1 is a block diagram illustrating a non-limiting embodiment of an arrangement for supplying heated air to a wing anti-icing system on an aircraft propelled by a jet engine.

The following detailed description is merely exemplary in nature and is not intended to limit the invention or the application and uses of the invention. Furthermore, there is no intention to be bound by any theory presented in the preceding background or the following detailed description.

Various embodiments of arrangements and methods for supplying heated air to a wing anti-icing system on an aircraft propelled by a jet engine are disclosed herein.

In one non-limiting embodiment, an ejector is fluidly coupled with the pre-cooler and receives a portion of the flow of cooled bleed-air air exiting the pre-cooler. The internal structure of the ejector creates a low pressure region as the cooled bleed-air passes through that draws cool air into the ejector. The cool air may be either the warmed cooling-air from the pre-cooler or ambient air from a freestream passing over the aircraft. Because the low pressure region can be generated with a relatively low volume of cooled bleed-air, and because the near-vacuum condition caused by the cooled bleed-air is capable of drawing in a much larger volume of cool air, the cool air enters the ejector at a much higher volume than the cooled bleed-air. The high volume of cool air combined with the low volume of cooled bleed-air yields a combined flow having the relatively high volume and high temperature needed to effectively combat the formation of ice on the wings.

When the cool air and the cooled bleed-air enter the ejector, the cool air becomes entrained to the flowing cooled bleed-air and the two flows mix. As they mix, the energy and high temperature of the cooled bleed-air is transferred to the cool air. In some embodiments, this can bring the overall temperature of the combined flow to between one hundred twenty degrees Fahrenheit and one hundred eighty degrees Fahrenheit. Fluid in this temperature range is well suited for use by the wing anti-icing system.

Furthermore, because only a relatively low volume of cooled bleed-air is needed to draw in a relatively high volume of cool air, the high volume of airflow needed to operate the wing anti-icing system can be provided with far less bleed-air than currently used by conventional systems. This reduced dependence on bleed-air substantially reduces the amount of compressed air that needs to be diverted from the jet engine's combustion chamber. Thus, use of the ejector permits the wing anti-icing system to receive the high flow of warm air needed to keep the wings free of ice without causing an unacceptable drain on the engines, leaving their power/thrust substantially undiminished.

It should be understood that the ejector may alternatively be used to similar effect with different flows of air. In another non-limiting embodiment, the arrangement may include an ejector. The ejector may be fluidly coupled with the pre-cooler and/or the ejector may be directly coupled with the compressor. From the pre-cooler, the ejector may receive cooled bleed-air (relatively warm) and it may also receive warmed cooling-air (relatively cool), as discussed in the preceding paragraph. From the compressor, the ejector may receive uncooled bleed air (hot). In other embodiments, the compressor may receive uncooled bleed air from the pre-cooler during times when the pre-cooler is not cooling the bleed-air. Additionally, the ejector may further be fluidly coupled with the free stream to receive ambient air (cold). Accordingly, the ejector may operate in the manner discussed above using a flow of cooled bleed-air (warm) and a flow of warmed cooling-air (cool). Additionally, the ejector may operate in the manner discussed above using a flow of bleed air (hot) and a flow of ambient air (cold). Additionally, the ejector may operate in the manner discussed above using a flow of bleed-air (hot) and a flow of warmed cooling-air (cool). Also, the ejector may operate in the manner discussed above using a flow of cooled bleed-air (warm) and a flow of ambient air (cold).

A greater understanding of the system and method for supplying heated air to a wing anti-icing system on an aircraft propelled by a jet engine may be obtained through a review of the illustrations accompanying this application together with a review of the detailed description that follows.

FIG. 1 is block diagram illustrating an arrangement 10 for supplying heated air to a wing anti-icing system. In the illustrated embodiment, arrangement 10 includes a pre-cooler 12 and an ejector 14. Arrangement 10 is fluidly coupled with a jet engine 16. Jet engine 16 has an intake section 18 and a compressor section 20. Pre-cooler 12 is fluidly coupled with intake section 18 via a conduit 22 and fluidly coupled with compressor section 20 via a conduit 24. It should be understood that FIG. 1 is exemplary in nature and that in other embodiments, arrangement 10 may comprise additional components and may be configured to be coupled with multiple jet engines as well as different types of jet engines other than jet engine 16.

Pre-coolers are known in the art and are commonly used in conjunction with jet engines to cool bleed-air. Any suitable pre-cooler may be employed with arrangement 10. In the illustrated embodiment, pre-cooler 12 receives a flow of bleed-air from compressor section 20 through conduit 24. Bleed-air from compressor section 20 arrives at the pre-cooler at a relatively high temperature. In some examples, bleed-air arrives at pre-cooler 12 at approximately five hundred degrees Fahrenheit. In other embodiments, the bleed-air may arrive at a higher or a lower temperature (e.g., between four hundred degrees and six hundred degrees Fahrenheit). Accordingly, pre-cooler 12 is comprised of any suitable material that can tolerate air flow at these temperatures. For example, pre-cooler 12 may be comprised of aluminum, titanium, stainless steel, nickel steel, exotic metal alloys, and composites.

Pre-cooler 12 is configured to route the flow of bleed-air through a network of cooling pathways that are internal to pre-cooler 12 and that are configured to conduct heat. This ability to conduct heat facilitates the exchange of heat, as discussed below.

Pre-cooler 12 is further configured to receive a flow of cooling air from the freestream surrounding the aircraft. At altitudes where jet aircraft commonly operate and at which ice is likely to form on an aircraft's wings, the free stream can be relatively cold. For example, assuming standard atmospheric conditions, at twenty thousand feet, the temperature is approximately minus twelve degrees Fahrenheit. At altitudes between thirty seven thousand feet and sixty five thousand feet, the temperature drops to approximately minus seventy degrees Fahrenheit. Pre-cooler 12 receives a flow of cooling-air from the freestream. This cooling-air is collected at intake section 18 and delivered to pre-cooler 12 via conduit 22. Air approaching and entering intake section 18 has not yet been compressed by compressor section 20 and is therefore still at ambient temperature. By collecting freestream air at the engine intake, the aerodynamics of the aircraft is substantially unaffected. However, it should be understood that in other embodiments, air may be collected from the freestream at any suitable location on the aircraft without departing from the teachings of the present disclosure.

Pre-cooler 12 operates in a manner similar to an automobile radiator. It is configured to direct the flow of cooling-air onto the cooling pathways through which the hot bleed-air is flowing. The interaction between the cold cooling-air as it passes over the cooling pathways as the hot bleed-air flows through the cooling pathways causes heat to be released from the bleed-air and absorbed by the cooling-air.

A primary effect of this interaction is that the bleed-air is cooled. The temperature of the bleed-air can drop from five hundred degrees Fahrenheit down to a range of approximately two hundred to three hundred degrees Fahrenheit as it passes through pre-cooler 12. In some embodiments, the temperature of the cooled bleed-air leaving pre-cooler 12 may be approximately two hundred fifty degrees Fahrenheit. At these temperatures, the cooled bleed-air can safely be managed and directed with minimal risk and with minimal complications and can be utilized by the aircraft's environmental control system and wing anti-icing system.

A secondary effect of the cooling-air passing over the cooling pathways as the hot bleed-air flows through them is that the temperature of the cooling-air is raised. In some examples, the cooling-air, which may start at a temperature range of approximately minus twelve degrees to minus seventy degrees Fahrenheit may be warmed up to a temperature range of approximately eighty degrees to one hundred degrees Fahrenheit. This warmed cooling-air, prior to the present invention, was considered to be a waste product and was reintroduced back into the freestream. In the present invention, however, this warmed cooling-air is used to substantially boost the flow of air being delivered to the wing anti-icing system. This will be discussed in detail below.

The flow of cooled bleed-air exits pre-cooler 12 via conduit 30. A portion of the flow of cooled bleed-air is directed to the aircraft's environmental control system via conduit 34 and a portion of the flow of cooled bleed-air is directed to the wing anti-icing system via conduit 36.

A flow of warmed cooling-air exits pre-cooler 12 via conduit 40. A conduit 42 fluidly couples ejector 14 to conduit 40 and enables ejector 14 to draw a portion of the flow of warmed cooling-air from conduit 40 into ejector 14. The remaining portion of warmed cooling-air in conduit 40 is reintroduced back into the freestream as waste product. In some embodiments or applications, one hundred percent of the warmed cooling-air is drawn into the ejector. In other embodiments, the wing anti-icing system demands more airflow than can be provided by pre-cooler 12. In such instances, ambient air may be drawn in to conduit 40 (as indicated by the arrow head pointing up towards pre-cooler 12) to supplement the warmed-cooling air. In other instances, ambient air may be used instead of the warmed cooling-air. In such instances, the ambient air may be drawn into conduit 40 and then into conduit 42 and on into ejector 14. In other instances, ejector 14 may be configured to operate using ambient air instead of warmed cooling-air. In such instances, ejector 14 may have a separate conduit delivering ambient air to ejector 14.

Prior to the present invention, the volume of cooled bleed-air that needed to be routed to the wing anti-icing system was relatively large. Thus, prior to the present invention, operation of the wing anti-icing system required a large flow of bleed-air from compressor section 20. In the present invention, however, a much smaller flow of cooled bleed-air needs to be routed to the wing anti-icing system. This is because the cooled bleed-air is routed though ejector 14. As discussed in detail below, passing a relatively small portion of the flow of cooled bleed-air through ejector 14 creates a low pressure region in ejector 14 that enables ejector 14 to draw in a relatively large portion of the flow of warmed cooling-air passing through conduit 40. Using conduit 42 as a straw, ejector 14 siphons a relatively large flow of warmed cooling-air from conduit 40. In this manner, the large rate of air flow that is required by the aircraft's wing anti-icing system is provided primarily by the warmed-cooling air, not by the cooled bleed-air. This greatly diminishes the demands placed on compressor section 20 for compressed air.

Inside ejector 14, the portion of the flow of cooled bleed-air mixes with the portion of the flow of warmed cooling-air to form a combined flow. During the mixing of the two flows, energy in the form of heat is transferred from the portion of the flow of cooled bleed-air to the portion of the flow of warmed cooling-air. In some embodiments, ejector 14 may be configured to yield a combined flow having a temperature range of approximately one hundred twenty degrees to one hundred eighty degrees Fahrenheit. In some embodiments, ejector 14 may be configured to yield a combined flow having a temperature of approximately one hundred sixty degrees Fahrenheit. Other temperatures and temperature ranges may also be possible.

The combined flow exits ejector 14 via conduit 50 and is routed to the aircraft's wing anti-icing system. In this manner, ejector 14 provides the wing anti-icing system with the relatively high volume airflow it needs to function properly. Ejector 14 also provides the wing anti-icing system with an airflow having a temperature that facilitates inhibiting the formation of ice. Ejector 14 also reduces the demand for bleed-air from compressor section 20 by utilizing the warmed cooling-air which, prior to the present invention, had been discarded as waste.

Figure 2:
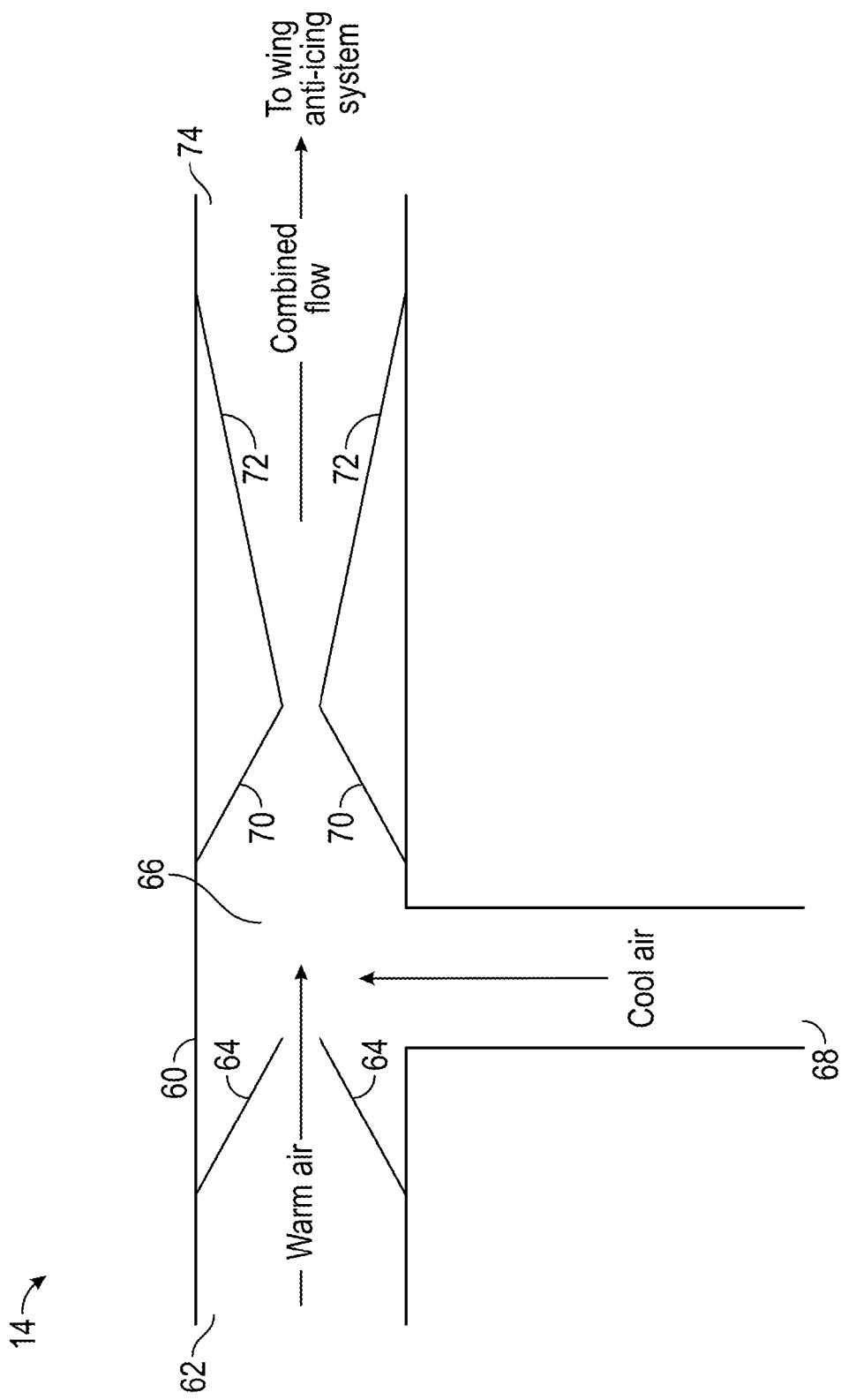
FIG. 2 is a schematic diagram illustrating a non-limiting embodiment of an ejector configured for use with the arrangement of FIG. 1.

FIG. 2 is a schematic view illustrating the inner structures and components of ejector 14. With continuing reference to FIG. 1, the internal structures of ejector 14 and their impact and effect on the airflows entering the ejector will now be discussed. It should be understood that FIG. 2 illustrates an exemplary embodiment only, and that other structural arrangements may also be employed without departing from the teachings of the present disclosure.

In the illustrated embodiment, ejector 14 includes a primary air passageway 60. Primary air passageway 60 is configured to receive cooled bleed-air from conduit 36 at inlet 62. The cooled bleed-air entering inlet 62 will be at a temperature of approximately two hundred degrees to three hundred degrees Fahrenheit. Accordingly, inlet 62, and in some cases, all of the structures of ejector 14, should be comprised of any suitable material that can accommodate these temperatures. For example, inlet 62 and other portions of ejector 14 may be comprised of aluminum, titanium, stainless steel, nickel steel, exotic metal alloys, and composites.

After entering inlet 62, the cooled bleed-air will be routed through a compressor 64. Compressor 64 will choke down the flow of cooled bleed-air, causing the cooled bleed-air to accelerate. After passing compressor 64, the cooled bleed-air will enter an expansion chamber 66 in the form of a jet of rapidly moving air. The jet of rapidly moving cooled bleed-air will begin to expand downstream of compressor 64 inside of expansion chamber 66. This expansion of the cooled bleed-air causes a substantial diminution in static pressure of the cooled bleed-air. The rapid movement of the jet of cooled bleed-air through expansion chamber 66 coupled with the substantial reduction in static pressure of the jet of cooled bleed-air creates a low pressure region inside of expansion chamber 66 which acts like a vacuum.

Primary air passageway 60 is configured to receive warmed cooling-air from conduit 42 at inlet 68. Inlet 68 is fluidly coupled at one end, with conduit 42 (not shown in FIG. 2) and at the other end with expansion chamber 66. When the movement and the expansion of the jet of cooled bleed-air causes the vacuum-like condition inside of expansion chamber 66, the warmed cooling-air moving through conduit 40 is drawn into conduit 42 and then further drawn into expansion chamber 66 where it is entrained to the jet of cooled bleed-air. From there, the cooled bleed-air and the warmed cooling-air will move together as a combined flow through the remainder of ejector 14.

As the combined flow moves through the remainder of primary air passageway 60, the cooled bleed-air and the warmed cooling-air will intermix. The relatively high temperature of the cooled bleed-air will be transferred to the relatively low temperature of the warmed cooling-air until both fluids are at approximately the same temperature. In some embodiments, the temperature of the combined flow will be between approximately one hundred twenty to one hundred eighty degrees Fahrenheit. In some embodiments, the temperature of the combined flow will be approximately one hundred sixty degrees Fahrenheit.

Because only a relatively low flow of cooled bleed-air is needed to draw in a substantial flow of warmed cooling-air, the ratio of the two fluids may be quite high. For example, in some embodiments, the ratio of cooling-air to bleed-air in the combined flow may be ten to one. In other embodiments, the ratio may be one hundred to one. In other embodiments, the ratio may be even higher or perhaps lower, depending on the specific application.

As the combined flow continues to move downstream through primary air passageway 60, it will encounter a compressor 70. Compressor 70 will compress the combined flow causing it to increase in speed and move downstream through primary air passageway 60 more rapidly. Downstream of compressor 70, the combined flow passes through a diffuser 72 which will slowly reduce the speed of the fluid. As the speed of the fluid diminishes, the static pressure of the fluid will increase. It may be desirable to provide the wing anti-icing system with a fluid having a relatively high static pressure. The combined flow will exit primary air passageway 60 at outlet 74 where it enters conduit 50. From there, the combined flow is directed to the wing anti-icing system.

Figure 3:
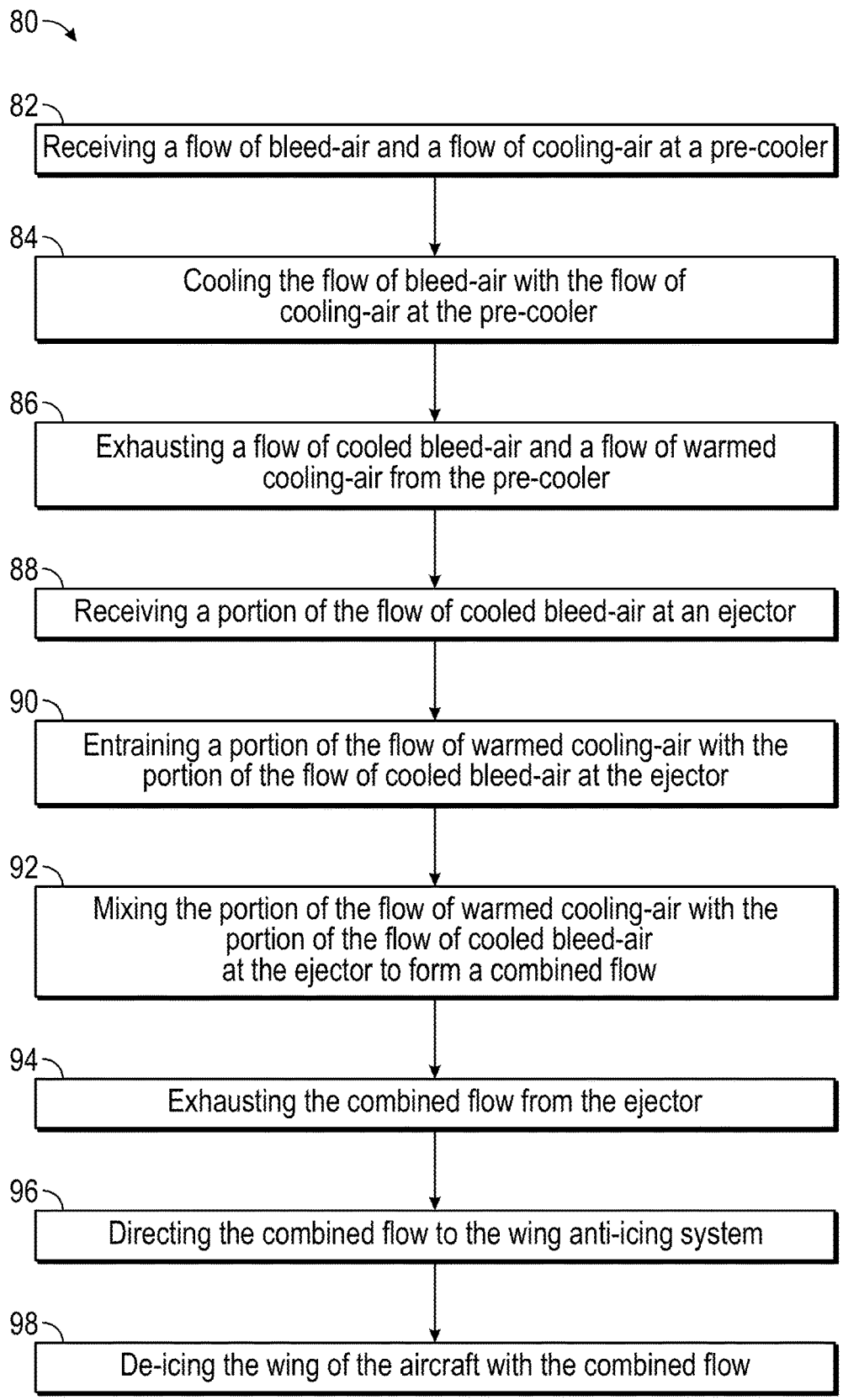
FIG. 3 is a flow diagram illustrating a non-limiting embodiment of a method for supplying heated air to a wing anti-icing system on an aircraft propelled by a jet engine

With continuing reference to FIGS. 1-2, FIG. 3 is a flow diagram illustrating a non-limiting embodiment of a method 80 for supplying heated air to a wing anti-icing system on an aircraft propelled by a jet engine. It should be understood that method 80 may be performed with a greater or lesser number of steps than are illustrated in FIG. 3 without departing from the teachings of the present disclosure. Furthermore, the steps need not be performed in the sequence illustrated or described but may be performed in any suitable sequence.

At step 82, a flow of bleed-air from a jet engine's compressor section is received at a pre-cooler. A flow of cooling-air from the freestream surrounding the aircraft is also received at the pre-cooler.

At step 84, the flow of bleed-air is cooled with the flow of the cooling-air in the pre-cooler. In some embodiments, the pre-cooler will provide a network of cooling pathways through which the hot bleed-air is routed and over which the cold cooling-air is passed. This action has the effect of cooling the bleed-air and warming the cooling-air.

At step 86, a flow of cooled bleed-air and a flow of warmed cooling-air are exhausted from the pre-cooler.

At step 88, a portion of the flow of cooled bleed-air is received at an ejector.

At step 90, the portion of the flow of cooled bleed-air is used to create a lower pressure region inside the ejector. This will draw in a portion of the flow of warmed cooling-air which will then be entrained by the portion of the flow of cooled bleed-air.

At step 92, the portion of the flow of cooled bleed-air is mixed with the portion of the flow of warmed cooling-air inside the ejector to form a combined flow. During this step, heat from the cooled bleed-air will be transferred to the warmed cooling-air until the combined flow has a substantially homogenous temperature.

At step 94, the combined flow is exhausted from the ejector.

At step 96, the combined flow is directed to the wing anti-icing system. This may be accomplished through the use of ducts, conduits, or any other suitable means of fluid conveyance.

At step 98, the combined flow is used by the wing anti-icing system to de-ice the wings of the aircraft.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. An arrangement for supplying heated air to a wing anti-icing system on an aircraft propelled by a jet engine, the arrangement comprising:
  a pre-cooler configured to receive a flow of bleed-air from the jet engine, to receive a flow of cooling-air from a freestream, to cool the flow of bleed-air with the flow of cooling-air, to exhaust a flow of cooled bleed air, and to exhaust a flow of warmed cooling-air; and
  an ejector configured to:
    receive a portion of the flow of cooled bleed-air from the pre-cooler,
    to entrain a portion of the flow of warmed cooling-air with the portion of the flow of cooled bleed-air, to mix the portion of the flow of cooled bleed-air with the portion of the flow of warmed cooling-air to form a combined flow having a temperature and a volume suitable for use by the wing anti-icing system, and to exhaust the combined flow.

2. The arrangement of claim 1, wherein the ejector is configured to accommodate the flow of cooled bleed-air having a temperature range of two hundred to three hundred degrees Fahrenheit (93.3 to 148.9 degrees Celcius).

3. The arrangement of claim 2, wherein the ejector is configured to accommodate the flow of cooled bleed-air having a temperature of two hundred fifty degrees Fahrenheit (121.1 degrees Celcius).

4. The arrangement of claim 1, wherein the ejector is configured to accommodate the flow of warmed cooling-air at a temperature range of eighty degrees to one hundred degrees Fahrenheit (26.7 to 37.8 degrees Celcius).

5. The arrangement of claim 4, wherein the ejector is configured to accommodate the flow of warmed cooling-air at a temperature of ninety degrees Fahrenheit (32.2 degrees Celcius).

6. The arrangement of claim 1, wherein the ejector is configured to mix the portion of the flow of cooled bleed-air and the portion of the flow of warmed cooling-air until the combined flow has a temperature range of one hundred twenty degrees to one hundred eighty degrees Fahrenheit (48.9 to 82.2 degrees Celcius).

7. The arrangement of claim 6, wherein the ejector is configured to mix the portion of the flow of cooled bleed-air and the portion of the flow of warmed cooling-air until the combined flow has a temperature of one hundred sixty degrees Fahrenheit (71.1 degrees Celcius).

8. The arrangement of claim 1, wherein the ejector is configured to yield the combined flow having a ratio of warmed cooling-air to cooled bleed-air of ten to one.

9. The arrangement of claim 1, wherein the ejector is configured to yield the combined flow having a ratio of warmed cooling-air to cooled bleed-air of one hundred to one.

10. The arrangement of claim 1, wherein the ejector is configured to entrain all of the flow of warmed cooling-air with the portion of the flow of cooled bleed-air.

11. A method for supplying heated air to a wing anti-icing system on an aircraft propelled by a jet engine, the method comprising the steps of:

receiving a flow of bleed-air from the jet engine and a flow of cooling-air from a freestream at a pre-cooler;

cooling the flow of bleed-air with the flow of cooling-air at the pre-cooler;

exhausting a flow of cooled bleed-air and a flow of warmed cooling-air from the pre-cooler;

receiving a portion of the flow of cooled bleed-air at an ejector;

entraining a portion of the flow of warmed cooling-air with the portion of the flow of cooled bleed-air at the ejector;

mixing the portion of the flow of warmed cooling-air with the portion of the flow of cooled-bleed air at the ejector to form a combined flow; and exhausting the combined flow from the ejector.

12. The method of claim 11, further comprising the step of directing the combined flow to the wing anti-icing system.

13. The method of claim 12, further comprising the step of de-icing a wing of the aircraft with the combined flow.

14. The method of claim 11, wherein the mixing step comprises mixing the portion of the flow of warmed cooling-air and the portion of the flow of cooled-bleed air to a ratio of ten to one.

15. The method of claim 11, wherein the mixing step comprises mixing the portion of the flow of warmed cooling-air and the portion of the flow of cooled-bleed air to a ratio of one hundred to one.

16. The method of claim 11, wherein the mixing step comprises mixing the portion of the flow of warmed cooling-air and the portion of the flow of cooled bleed-air until the combined flow has a temperature range of one hundred twenty degrees to one hundred eighty degrees Fahrenheit (48.9 to 82.2 degrees Celcius).

17. The method of claim 16, wherein the mixing step comprises mixing the portion of the flow of warmed cooling-air and the portion of the flow of cooled bleed-air until the combined flow has a temperature of one hundred sixty degrees Fahrenheit (71.1 degrees Celcius).

18. The method of claim 11, wherein the step of entraining the portion of the flow of warmed cooling-air with the portion of the flow of cooled bleed-air at the ejector comprises entraining all of the flow of warmed cooling-air.

\* \* \* \* \*